United States Patent [19]

Lawn

[11] 4,163,934
[45] Aug. 7, 1979

[54] METHODS AND APPARATUS FOR CHARGING BATTERIES

[76] Inventor: Francis Lawn, 378 W. Park Ave., Oakhurst, N.J. 07755

[21] Appl. No.: 813,265

[22] Filed: Jul. 6, 1977

[51] Int. Cl.$^2$ ............................................. H02J 7/04
[52] U.S. Cl. ...................................... 320/23; 320/32; 320/39
[58] Field of Search ................................... 320/22-24, 320/39, 40, 20, 21, 32

[56] References Cited

U.S. PATENT DOCUMENTS

| 3,576,487 | 4/1971 | Chase | 320/39 |
| 3,794,905 | 2/1974 | Long | 320/20 |
| 3,936,718 | 2/1976 | Melling et al. | 320/39 X |
| 3,992,658 | 11/1976 | Bechtold et al. | 320/40 X |

Primary Examiner—Robert J. Hickey

[57] ABSTRACT

The disclosed system of charging a battery provides for accurate regulation of the charging current which is maintained constant during the initial and final phases of the charging cycle. The slope of battery-voltage increase during continued charging of the battery is monitored at frequent intervals. Failure of the battery voltage to rise more than a threshold increment during a slope-testing interval signifies full-charge, and is utilized to terminate the charging operation. The disclosed slope detector includes a storage capacitor having a terminal that is isolated ideally from leakage-causing circuit connections.

The disclosed circuit is economical in terms of low cost and avoidance of complexity, and includes provision for suppressing potentially dangerous voltages at the battery terminals when there is no connected battery and for blocking charge of a battery connected backwards and of a battery whose voltage is so low as to signify a defect rather than depleted condition.

19 Claims, 6 Drawing Figures

METHODS AND APPARATUS FOR CHARGING BATTERIES

FIELD OF THE INVENTION

This invention relates to methods and apparatus for charging electric storage batteries, particularly (but not only) the lead acid type.

Electric storage batteries of the lead acid type have been used to power material handling equipment for a good many years. These batteries are generally expensive and therefore the life of the battery affects the economics of the operation. The discharge of the battery, within reasonable limits, will not normally damage the battery but the charging system can have a decided effect on battery life.

If the charging system does not completely charge the battery, full energy capacity of the battery will not be available for the desired task. In addition to this, if a battery is not completely charged during each changing operation, the cells become unbalanced and a periodic equalization charge is required. If, on the other hand, the charge is not terminated when the battery reaches full capacity, the excessive charge does damage to the battery and decreases its effective life.

Many circuits have been developed for charging and terminating the charge of electric stroage batteries. The charge process is relatively simple to those skilled in the field but the automatic termination when the battery has reached full capacity has been a problem. The battery voltage is not a good indication of battery charge because it varies with charge current, temperature, battery age, acid concentration, battery construction and even between similar batteries.

Being that voltage is not considered a good indication of charge, time has become the most commonly used termination system. If a battery is charged with a controlled current, a time can be picked in which the amperehours removed from the battery will be replaced. Unfortunately the amperehours removed from the battery are very seldom known, so the time setting will generally provide an over or under charge to the battery.

The fact that the battery voltage becomes constant while the battery is being charged has been known since the early 1930's. Apparently this fact has not been used to terminate the battery charge because the voltage change or lack of change due to charge has been masked by other voltages and was difficult to obtain. According to a recent method of controlling charge termination when the battery voltage becomes constant, means is provided to detect zero rate-of-voltage-change. The charge current is interrupted in order to measure the open circuit voltage of the battery periodically. That measurement is subject to numerous variables, it requires interruption of charging long enough for battery voltage to decay to reasonably stable condition, and it involves relatively complicated and costly control circuits.

Still further, a variety of circuits have been proposed for taking into account the various circumstances encountered in use of battery chargers. One requirement is to regulate the level of charging current so as to be high during a first phase of the charging cycle and to be reduced after gassing starts, which occurs at about 85% of full charge. Missing-battery, short-circuited battery and reversely connected battery are other conditions that should be taken into account.

SUMMARY OF THE INVENTION

An object of the invention resides in provision of a novel battery-charging method and apparatus wherein testing the battery for completion of battery-charge is performed while the battery is being charged. In the novel method and apparatus, the charging current is subjected to tight control during tests of the slope of the voltage-versus-time characteristic of the battery to ensure a voltage increase occurring during each such slope test except upon completion of the charging cycle. When the battery is fully charged, the slope of the voltage-versus-time characteristic declines below any value that occurs earlier in the charging cycle. The occurrence of a slope below a threshold indicates that the charging process is complete. Detection of this condition signals completion of the charging process, which could be signalled in various ways, as by activating an alarm. Ideally it is used to interrupt the supply of charging current, thus automatically terminating the charging cycle.

The initial phase of about 85% of the charging cycle can be performed at high current for quickly charging the battery. During this initial phase, the charging current is maintained constant within such narrow limits that spurious occurrence of a termination-of-charge test result is avoided. This is a specific but important feature of the invention. A check is made of battery-voltage increments during frequent test intervals while charging current continues to flow. The charging current is maintained constant within narrow limits at one level during the initial phase of the charging cycle and at another level during the final phase. Provision is made for terminating the charging process in case the voltage increment should be less than a predetermined minimum increment. In this example, this increment is the same throughout the charging cycle. The system takes into account the limited deviation of the battery-charging current that can occur during any one test interval despite careful regulation of the current and the differences in battery voltage that result from the flow of such regulated current. The duration of the time interval used in testing for voltage increments is related to the latitude of voltage increments that could occur due to all causes in a battery that is normal (not defective) so as to insure developing at least the predetermined minimum voltage increment in each test interval until the battery becomes fully charged. This criterion is met when a normal battery is being charged in a cycle that includes a final phase at reduced but constant charging current. This final phase terminates when the threshold voltage increment is not attained during the test interval. The same criterion of minimum voltage increment for terminating the charging process is utilized in the case of a battery having a shorted cell. In that case the good cells would become fully charged; and while the battery's terminal voltage would not reveal the fully charged condition, the slope of the voltage-versus-time curve would decline below the predetermined minimum increment and the charging current would be interrupted.

The term "constant current" used herein applies to both uniform direct current and rectified current having characteristic short-time pulsations which nonetheless is regulated to provide what is effectively a constant battery-charging current. In the case of rectified current, a signal derived from a shunt in the charging current path is smoothed to provide a regulating control signal free of the wave-form characteristic of the rectified charging current. A related but subsidiary object of the invention resides in the provision of a novel voltage-increment testing circuit wherein a storage capacitor is utilized. The capacitor has a terminal that is isolated ideally from all circuit connection during the test interval, for minimized leakage.

A further object of the invention resides in provision of a battery charging circuit that compatibly and economically incorporates the foregoing battery-charge termination feature together with other features found in known battery charge control circuits. Such features for example may include some or all of the following.

The battery voltage increases only gradually during the first charging phase at high current until gassing starts to occur, so that the level of constant-current should be reduced or tapered to a lower charge-completion level. This is achieved here in a manner that assures avoidance of sub-threshold voltage increments that otherwise would terminate the charging cycle prematurely.

A variety of objectionable conditions may be present at the terminals of the battery charging circuit. Dangerously high battery voltage can develop at those terminals in case no battery is present. A battery might have its terminals reversely polarized in relation to the terminals of the charging circuit. A short-circuited battery or one having shorted cells might be connected to the charging circuit. Such batteries might damage the charging circuit and in any case they should not wastefully be put through the charging cycle. The illustrative embodiment of the invention described in detail below and shown in the accompanying drawings includes stable and economical yet uncomplicated provision for these contingencies and represents further aspects of the invention.

The nature of the invention in its various aspects, including the foregoing and other novel features and advantages will be better appreciated from the following detailed description of the illustrative embodiment of the invention shown in the accompanying drawings.

DETAILED DESCRIPTION OF THE ILLUSTRATIVE EMBODIMENT

Figure 1:
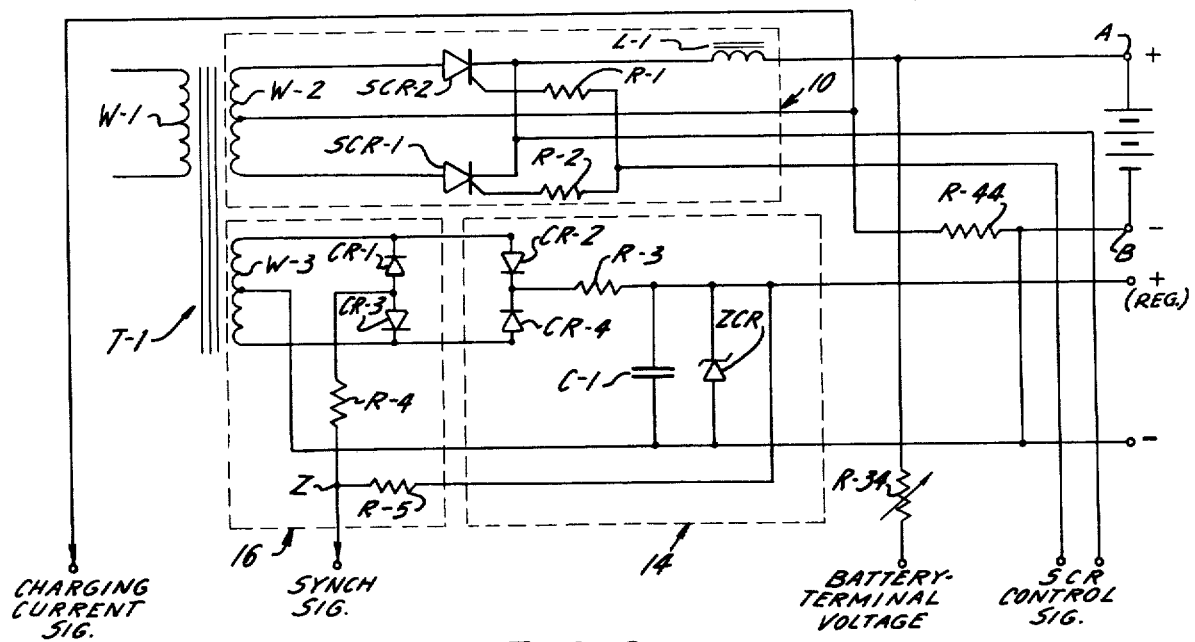
FIG. 1 is a wiring diagram of a circuit for providing rectified battery charging current and for providing both a regulated direct-current source and various signals for the control circuit of the charging-current circuit.

Referring to FIG. 1, the basic battery-charging circuit 10 may now be described. The power transformer T-1 has a primary winding W-1, and a centertapped secondary winding W-2 connected to one terminal of "shunt" resistor R-44. Positive half-waves are applied to the anodes of SCR-1 and SCR-2 alternately, and if these SCR's are conductive for any part of the AC half-waves, the cathodes of the SCR's deliver full or partial half-waves of rectified current to the positive output terminal A of the charging circuit and the positive battery terminal via choke L-1. The current return path is from the negative battery terminal and the negative terminal B of the charging circuit through "shunt" R-44 to the centertap of winding W-2.

Firing of SCR-1 and SCR-2 is controlled by pulses on their gates through SCR-protective resistors R-1 and R-2. These pulses are provided by a firing-angle control circuit 12 including the secondary winding of isolation transformer T-2 (FIG. 2) in response to the start of each current pulse in its primary when unijunction transistor Q-4 becomes conductive. This occurs when the voltage on capacitor C-5 connected to the base of this transistor rises to the critical operating voltage of transistor Q-4. If this voltage occurs late in each half-cycle of the AC wave, then very little battery-charging current will flow. Early conduction of transistor Q-4 will cause early firing of SCR-1 and SCR-2 in successive half-cycles, and high values of battery-charging current will flow. Transistor Q-4 is energized by the regulated DC supply 14 via resistor R-27.

At the start of operation, the + input of high-gain operational amplifier OA-2 has a potential of about midway between the (+) and (−) of the regulated DC supply. Junction x between resistors R-17, R-20 and R-19 is slightly higher than junction y between resistors R-15 and R-16, by virtue of the adjustment of potentiometer R-14. (This presumes no current through "shunt" resistor R-44.) In that condition the output of amplifier OA-2 is severely low, i.e., near (−) potential of the DC supply. Consequently a potential below the (+) bus is applied via resistor R-22 to the base of PNP transistor Q-1 at the junction of the voltage-divider R-23 and R-22. In this condition of the circuit, transistor Q-1 is conductive, so that a charging current limited by resistor R-24 charges capacitor C-5. The values of resistor R-24 and capacitor C-5 in an example are 1000 ohms and 0.1Mfd., respectively. In this condition of the circuit, capacitor C-5 attains virtually full charge in about 0.1 millisecond. Resistors R-25 and R-26 in series form a shunt circuit across capacitor C-5 having a combined resistance of about 25,000 ohms in an example, and thus the shunt circuit has little effect on the rate-of-charge of capacitor C-5.

The following circuit provides for control of battery-charging operation. In this illustrative circuit, transistor Q-3 serves dual purposes. At some added circuit complexity it might be replaced by two separate transistors each serving a separate function, as described below.

In one of its functions, transistor Q-3 serves to discharge capacitor C-5 at a precise point in each half-wave of the AC input, to provide synchronization between the firing angle control circuit 12 and the AC line. Transistor Q-3 responds to a "synch signal" or more briefly to "synch". Power transformer T-1 has a center tapped secondary winding W-3 which in turn provides two purposes. One purpose is to energise a DC supply for virtually the whole control circuit, and the second is to provide a reference AC signal for providing the synch signal mentioned above. The DC supply circuit 14 includes diodes CR-2 and CR-4 connected in series opposition across winding W-3. The junction of these diodes is connected to resister R-3 whose opposite terminal is connected to filter capacitor C-1. Diodes CR-2 and CR-4 are polarized so that this connection is positive relative to the centertap of winding W-3 to which capacitor C-1 is connected as shown. A zener diode ZCR across capacitor C-1 acts with current-limiting resistor R-3 to maintain a stable DC potential across this capacitor.

A sunchronizing or "synch" signal is provided by circuit 16. Diodes CR-1 and CR-3 are connected in series opposition across winding W-3, but are polarized opposite to diodes CR-2 and CR-4, and connected to the corresponding terminals of winding W-3.

Figure 3:
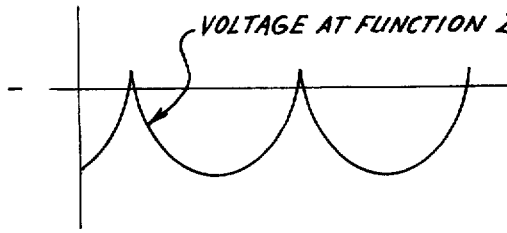
FIG. 3 is a diagram illustrating a detail of the operation of the circuits in FIGS. 1 and 2.

Resistors R-4 and R-5 form a voltage divider. The voltage applied to this voltage divider includes the DC supply voltage from (+) to minus, plus the rectified half-wave voltage developed alternately by the halves of winding W-3 and diodes CR-1 and CR-3. These diodes are polarized to develop negative-going half-waves. The net effect of the DC voltage and the rectified AC at junction z is illustrated in FIG. 3. This wave represents the instantaneous voltage division of the DC voltage added to the AC half-waves. In an example, R-4 and R-5 are 2,200 ohms and 10,000 ohms respectively. The voltage at junction z is applied to diode CR-5 which is blocking for most of the time because the applied voltage is negative. Positive potential is applied via diode CR-5 to the base of transistor Q-3 when junction z goes positive. This is the required synch signal for discharging the capacitor C-5. Diode CR-5 protects the base of transistor Q-3 against damage that might otherwise be caused by negative potential. Accordingly capacitor C-5 is discharged at the end of each rectified half-wave of the AC input to the SCR's.

The second function of transistor Q-3 is to maintain capacitor C-5 essentially discharged and thereby disable the battery-charging circuit unless a number of conditions are satisfied. These "disabling" conditions include: (1) an internally shorted battery or otherwise shorted terminals A and B of the charging circuit; (2) excessively low battery voltage which may be due to either one or more shorted cells in a defective battery or due to an incorrect battery; (3) absence of a battery; and (4) a reversed battery. Consequently no dangerous output voltage can develop at the output terminals A and B of the charging circuit when no battery is present. No current will flow in the battery-charging circuit in case of a short-circuit (due to the battery or otherwise) or in the case of abnormally low battery voltage at terminals A and B.

When serving for disabling the charging circuit, transistor Q-3 is rendered conductive continuously by the following protector circuit. At the outset, as indicated above, amplifier OA-2 has near-negative output potential, causing current flow in transistor Q-1. This provides current in the voltage divider consisting of resistors R-24, R-25 and R-26. Transistor Q-2 whose emitter is connected to the junction of resistors R-25 and R-26 becomes conductive when the base voltage of transistor Q-2 is abnormally close to negative. (In this circuit, transistor Q-2 is type PNP and transistor Q-3 is type NPN.) When transistor Q-2 conducts, transistor Q-3 also conducts and discharges capacitor C-5. The base of transistor Q-2 is connected to the junction of resistors R-6 and R-7 which form a sampler 18 for the voltage at the terminals of the battery charging circuit. These resistors, in series with adjustable resistor R-34, form a voltage divider between the positive and negative output terminals A and B of the charging circuit. So long as any of the abnormal conditions (1), (2), (3) or (4) prevail, transistor Q-2 conducts and acts through transistor Q-3 to prevent significant charging of capacitor C-5. Capacitor C-5 will become charged to that minimal potential needed for transistors Q-2 and Q-3 to become conductive, but this is far below the threshold of transistor Q-4. Transistor Q-2 and its associated circuit including dual-purpose transistor Q-3 serves as a protector against open circuit, short-circuit, low voltage and reversed battery conditions at the charging circuit terminals A and B.

It may now be assumed that a battery having a pescribed minimum voltage and proper polarity is connected to the output terminals A and B of the battery charging circuit. Transistor Q-2 is disabled. Transistor Q-3 is operative as described above to discharge capacitor C-5 periodically in response to the synch signals. Transistor Q-4 operates to fire SCR-1 and SCR-2. The flow of battery charging current produces voltage waves in shunt resistor R-44, providing a pulsating voltage that is a measure of the charging current. The maximum battery-charging current Im (FIG. 5), the minimum battery-charging current If, and the taper of the current from Im to If are determined by battery-charging-rate control circuit 22.

The charging-current sampling voltage across shunt R-44 is applied between the (−) DC bus and one terminal of resistor R-20 that is part of voltage divider R-17, R-20. The voltage injected into this voltage divider circuit by shunt R-44 changes the relative condition of the inputs of amplifier OA-2 from that pevailing when no current flows in shunt R-44. Resistors R-18 and R-19 in series with the inputs of amplifier OA-2 and capacitor C-3 across the inputs of amplifier OA-2 have a long time constant such that the pulsating voltage that develops across "shunt" R-44 is averaged as a constant or near-constant signal at the differential input terminals of amplifier OA-2. Feed-back capacitor C-4 and resistor R-21 supplement the input filter in causing the output of amplifier OA-2 to respond to the averaged analog of the rectified battery-charging current. When the voltage at the (−) input of amplifier OA-2 increases, the base of transistor Q-1 is biased to reduce conduction of this transistor. This reduces the rate of charge of capacitor C-5 and delays the point at which transistor Q-4 and controlled rectifiers SCR-1 and SCR-2 fire. The timing of this firing point in the successive half-waves of battery-charging current determines the level of battery-charging current.

Potentiometer R-14 adjusts the relative resistances in the upper segments of voltage divider R-15, R-16 and voltage divider R-17, R-20 and takes into account the voltage developed by amplifier OA-1 at the (+) input of operational amplifier OA-2. Initially the output voltage of amplifier OA-1 is near the (−) bus. Potentiometer R-14 is effective for setting the maximum current provided by the battery-charging circuit. It is this current that flows during the first phase of the battery-charging cycle. This first phase may continue for 50% of the battery-charging cycle in case of a battery that was completely discharged initially, or this initial phase may be of shorter duration, depending on the initial condition of the battery. The end of this initial charging phase is recognized by checking the battery voltage. When a value of approximately 2.3 volts per cell of a lead-acid battery is reached, the battery is considered to be about 85% charged. It is harmful to continue charging the battery at maximum current because gassing of the battery usually occurs at about this point. This voltage level is not particularly critical, but it is generally considered desirable to reduce the charging current at about 2.3 volts per cell.

The following circuit provides for tapering the charging current when the battery voltage attains the level of 2.3 volts (for example). In the taper-charge phase, the charging current is reduced progressively as the voltage-per-cell rises. In this phase of the battery-charging cycle, the reduction in current is gradual. The reduction of current is at all times dependent on actual increase in the battery voltage. Charging of the battery terminates when the voltage increment occuring over any one slope-detection interval in the charging cycle is less than a prescribed value, as is explained in detail below. In the circuit now to be described, the taper of charging current is made dependent on a sufficient voltage increment developing in each detection interval to avoid premature termination of the battery charging cycle.

Operational amplifier OA-1 has a reference voltage applied to its (−) input terminal via resistor R-10 by voltage divider R-8, R-11 connected between the terminals of the regulated DC supply. Voltage divider R-6, R-7 (described above) connected between resistor R-34 and the negative DC terminal of the battery provides a voltage at the (+) input of amplifier OA-1 via resistor R-9 for comparison with the reference voltage at the (−) input terminal. When the 2.3-volt-per-cell condition is reached, amplifier OA-1 provides a changed output that is applied via adjustable resistor R-13 to the (+) input of amplifier OA-2. This has the effect of changing the reference voltage of amplifier OA-2, and results in a progressive decrease in the charging current supplied to capacitor C-5 under control of transistor Q-1. In this manner, increase in battery voltage is utilized to provide for progressive reduction in the battery-charging current.

The influence of the circuit of amplifier OA-1 on the battery-charging current is twofold. First, by virtue of adjustable gain-control resistor R-12 in the feed-back circuit of amplifier OA-1, the rate of current decrease can be controlled to avoid premature termination of the charging cycle. Second, by virtue of adjustable resistor R-13 between the output terminal of amplifier OA-1 and the resistor network at the input of amplifier OA-2, the lower limit of the battery charging current can be adjustably established. Resistors R-13 and R-18 here serve as a voltage divider.

Figure 5:
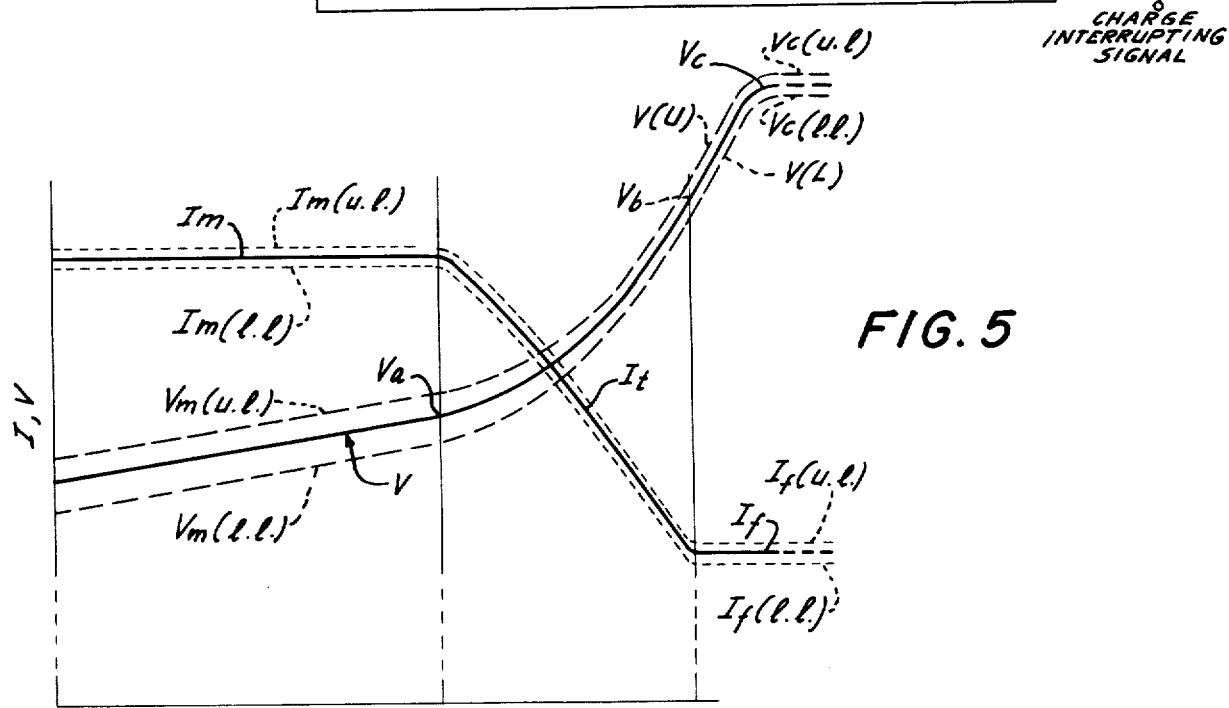
FIG. 5 is a diagrammatic representation of current and voltage variations in a battery-charging cycle provided by the circuits of FIGS. 1, 2 and 4, for a normal battery needing the full charging cycle.

Referring to FIG. 5, the charging cycle may be considered in relation to the circuit thus far described. It will be remembered that adjustment of potentiometer R-14 determines the maximum constant charging current Im, to supply approximately 85% of the charge of a battery that was completely discharged initially, this phase lasting about 50% of the total duration of the battery charging cycle. The end of the first charging phase is reached when a predetermined volts-per-cell Va is attained (2.3 volts for example). It is approximately at this point when gassing normally starts. Resistor R-12 affects amplifier OA-1 to effect a progressive reduction in charging rate as the battery voltage increases, up to a voltage level Vb. After this point, there is no useful purpose in reducing further the average charging current. The final charging phase continues with a constant charging current $I_f$, which is established by adjusting resistor R-13.

The action of resistors R-12 and R-13 may be explained more fully as follows. The network consisting of potentiometer R-14 and series resistors R-15 and R-16 represents a reference at the (+) input of operational amplifier OA-2. Amplifier OA-1 delivers a progressively increasing output voltage to the (+) input of amplifier OA-2 after voltage point Va (FIG. 5) has been reached. The slope of this increase in output voltage of amplifier OA-1 in relation to the battery-voltage sample depends upon the setting of adjustable feedback or gain-control resistor R-12. (Capacitor C-2 suppresses high-frequency signals.) During this operation, the charging current declines, thus decreasing the voltage injected between the (−) DC bus and the (−) input of amplifier OA-2. Resistor R-12 thus determines the rate of current decline in relation to the rise of battery voltage. In consequence, there can be a decrease in battery-charging current during the taper-charge phase, only as a function of battery-voltage increase. Resistor R-12 determines the slope of charging-current decline versus the increase of the battery voltage.

At its upper limit, the output terminal of OA-1 approaches the potential of the (+) DC bus. The (+) input of amplifier OA-2 is connected to the junction of resistors R-13 and R-18. Cnsequently the maximum potential to which the (+) input of amplifier OA-2 rises is largely determined by the voltage division between resistors R-13 and R-18, assuming a given setting of potentiometer R-14 and given values of voltage-divider resistors R-15 and R-16. It follows that the setting of resistor R-13 determines the lower limit of the charging current, considering the operation of the previously described circuits 10 and 12.

The battery is considered fully charged when its voltage Vc is attained. The absolute value of this voltage is by no means consistent among different batteries or with the same battery at different temperatures, and it may well vary in dependence on different values of resistance in the battery and in the battery charging circuit. Where (as here) the battery voltage is measured while charging current continues to flow, the value of voltage Vc is also affected by the final battery-charge current $I_f$. The fact that the fully charged condition of the battery has been attained can be detected by testing the slope of the voltage-versus-time curve of the battery. When that slope has reached the level or near-level state, the voltage Vc has been reached for a given set of conditions and the charging cycle is complete. Charging should be interrupted. Continued charging after this point would be accompanied by gradual decrease in battery voltage. Some damage to the battery would occur, and continued charging would be wasteful.

Figure 4:
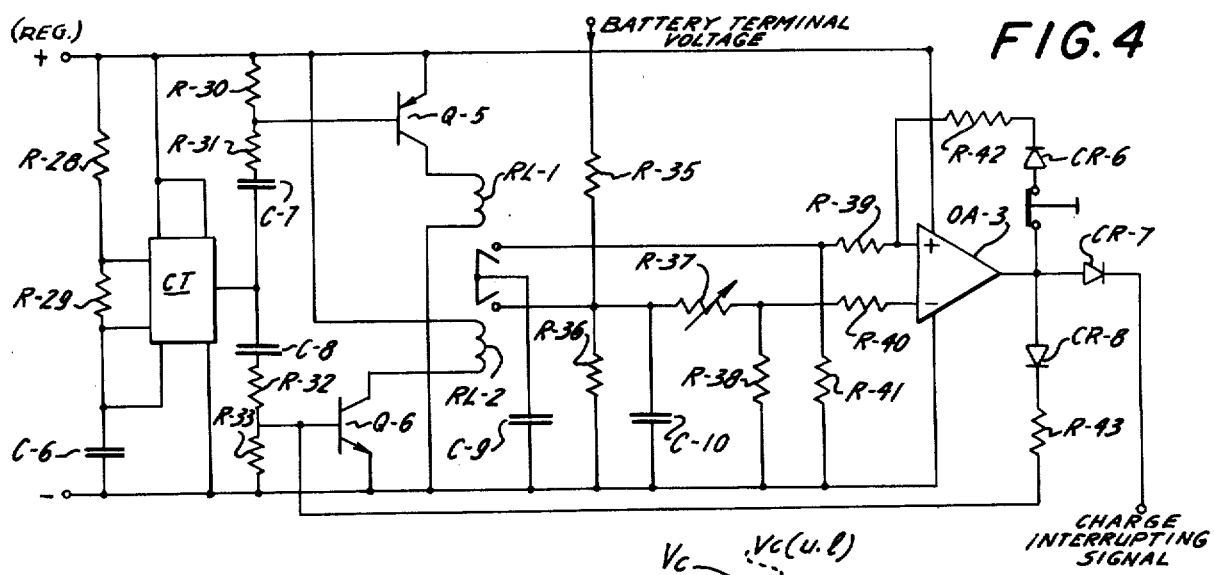
FIG. 4 is a wiring diagram of a slope detector which, with FIG. 2, completes the control circuit for the circuit of FIG. 1.

The following circuit (FIG. 4) is a slope detector for evidencing attainment of voltage Vc, and it includes automatic charge-interrupting output means. A cycle timer CT, here in the form of a commercially available solid-state integrated circuit, provides a negative-going square-topped output signal every four minutes, lasting about one second, for example. This could conceivably be a clock-driven cam and appropriate voltage means. Cycle timer CT is energized by the regulated DC supply. Resistor R-28, resistor R-29 and capacitor C-6 determine the time between negative-going output signals. Resistor R-29 and capacitor C-6 determine the duration of the negative-going signal. In this example of 4 minutes followed by a one-second negative-going signal, resistors R-28 and R-29 are 8.2 megohms and 47 kilohms, respectively, and capacitor C-6 is 25 Mfd. The output terminal of cycle timer CT is connected to two pulse shapers. One pulse shaper, including capacitor C-7 and series-connected resistors R-30 and R-31 operates on the negative-going slope of the one-second output signal to create a pulse at the base of PNP transistor Q-5, turning it on, energizing relay RL-1. At the end of the one-second output signal of the cycle timer, a second pulse shaper including resistors R-32 and R-33 and capacitor C-8 responds to the positive-going slope of the one-second output signal to turn on NPN transistor Q-6 energizing relay RL-2. Each of these relays remains energized for about 15 milliseconds, for example, by virtue of properly proportioned pulse-shaping components.

Storage capacitor C-9 has one terminal connected to the negative battery terminal and it has its opposite terminal connected by the contacts of relay RL-2 to the battery voltage sampling voltage divider R-34, R-35 and R-36. Large capacitor C-10 in parallel with resistor R-36 rests at the terminal voltage across resistor R-36. When the contacts of relay RL-2 close, the sampled voltage across resistor R-36 and capacitor C-10 is stored in capacitor C-9. Capacitor C-10 in an example is 450 Mfd while capacitor C-9 is 1.5 Mfd, so that the voltage of capacitor C-10 is consistently affected only very little in the course of charging capacitor C-9. This occurs during closure of relay RL-2 at the end of the one-second negative output signal of the cycle timer. At this time and during the ensuing test interval (e.g. 4 minutes), this voltage sample is also applied to a network including series resistor R-37, shunt resistor R-38 and series resistor R-40, connected to the (−) input of amplifier OA-3. The (+) input of that amplifier is biased to the negative bus of the DC supply via series resistor R-39 and shunt resistor R-41. Because the (+) input terminal of amplifier OA-3 is more negative than the (−) input terminal, the output terminal of OA-3 remains at a low potential. Nothing responds to this condition.

Four minutes later, during the negative-going pulse at the start of the one-second pulse of cycle timer CT, relay RL-1 is energized. This connects capacitor C-9 via resistor R-39 to the (+) input terminal of amplifier OA-3. At this time the (−) input terminal of amplifier OA-3 is connected by the previously described network to the battery-voltage sampling junction between resistors R-35 and R-36 and to capacitor C-10. The voltage applied to the (−) input terminal of amplifier OA-3 is less than that across resistor R-36 by the voltage-division of adjustable resistor R-37 and resistor R-38. In an example, adjustable resistor R-37 is a maximum of 50 ohms (approximately) and resistor R-38 is 47,000 ohms.

Figure 6:
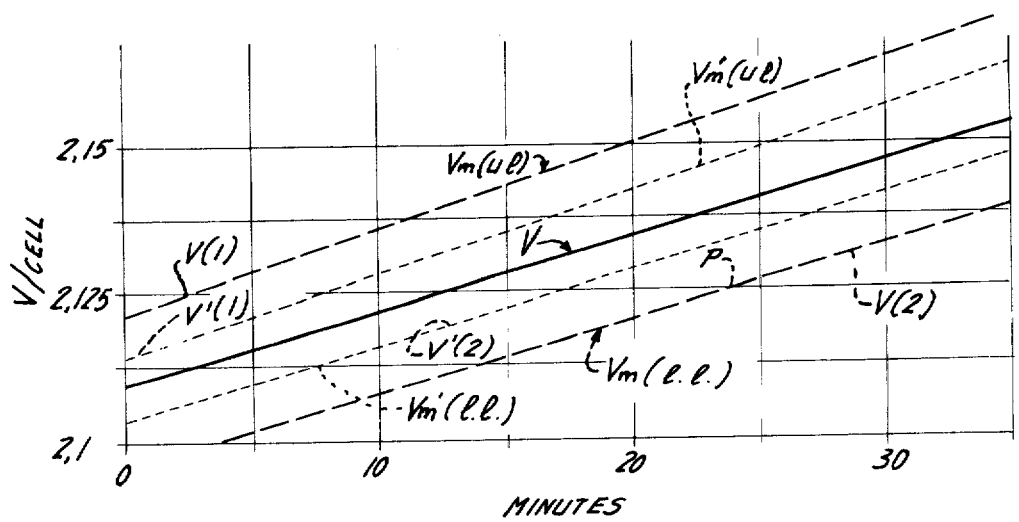
FIG. 6 is an enlarged detail of FIG. 5, including illustrative numerical coordinates.

Referring to FIG. 6, there is small but recognizable slope of the voltage-versus-time curve V from the start to Va; and there is a steep slope beyond point Va until a sharp decrease in slope occurs. There is a very small and declining slope of the voltage-versus-time curve starting at the voltage Vc. Resistor R-37 is adjusted in relation to resistor R-38 so that amplifier OA-3 will be non-responsive to closure of relay RL-1 during the first phase of the charging cycle when the current is constant at Im and when the voltage-versus-time curve has a small but recognizable slope, and yet amplifier OA-3 will respond to closure of relay RL-1 when there is a lesser slope of the time-versus-voltage curve at voltage Vc. More explicitly, when relay RL-1 closes at the end of a four-minute sampling or test interval during the first phase of the battery-charging cycle, the voltage at the (−) input of the amplifier OA-3 is larger than the sample voltage of storage capacitor C-9. When slope of the voltage-versus-time curve levels off sufficiently, following the steep rise, and when relay RL-1 connects storage capacitor C-9 to the (+) input terminal of amplifier OA-3, the voltage at the (−) input terminal is less than that at the (+) input terminal. High gain amplifier OA-3 (with no negative feedback) responds, its output terminal shifting sharply from near-negative to near-positive in relation to the DC supply voltage. Positive feedback through diode CR-6 and resistor R-42 to the (+) input terminal causes amplifier OA-3 to become latched in this state. This positive output signal of the amplifier is also fed back to the base of transistor Q-6 via diode CR-8 and resistor R-43 to energize relay RL-2 continuously and to keep the sampling capacitor C-9 at the voltage of capacitor C-10.

As soon as the fully charged battery is removed, both capacitors C-9 and C-10 become discharged. Therefore there is no danger of a high stored voltage being connected from capacitor C-9 to the (+) input terminal of amplifier OA-3 when a new, discharged battery is first connected and when timer CT causes relay RL-1 to be energized.

The main purpose of the whole voltage slope detector is to shut off the charging current. This results from the positive output of amplifier OA-3 being coupled via diode CR-7 to the (+) input terminal of amplifier OA-2. This causes positive output from this amplifier to drive the base of PNP transistor Q-1 positive and thereby block further charging current to capacitor C-5.

The locked-out state of the whole system as described immediately above could continue forever. When a new battery is installed, normally closed switch SW-1 is opened manually for a moment. The voltage of OA-3 at its (+) terminal drops to the negative bus at once, and the whole system is reset.

It is of considerable practical importance for the storage capacitor C-9 (FIG. 4) to retain the full charge that it receives when the contacts of relay RL-2 close, over a long test interval. The disclosed circuit shows only a contact of each relay RL-1 and RL-2 to be connected to the upper (in the drawing) terminal of capacitor C-9. In this way the possible causes of leakage of charge stored in capacitor C-9 is minimized over the long (e.g. 4 minute) test interval of the slope detector.

Some minute leakage may occur. In the illustrated circuit, a loss of very few millivolts could affect the operation of the slope detector. One of the functions of adjustable resistor R-37 is to reduce the voltage at the (−) input of amplifier OA-3 from that which is present across the capacitor C-10 to take into account or compensate for the minimized leakage of charge occurring in the storage capacitor C-9 over the (4 minute) test interval of the slope detector. A second function of resistor R-37 (in relation to resistor R-38) is to adjust the inputs to amplifier OA-3 so that the amplifier will respond to the prescribed small battery-voltage increment that characterizes point Vc, or to a small decline beyond point C.

Resistor R-37 in an example is set to have a two-millivolt drop. In a battery-charging circuit having a regulated DC supply of 12 volts, the components are proportioned to develop about six volts across resistor R-36. In the operation of the described control circuit, it is important to avoid terminating the charging current while the battery voltage is increasing at the slow but normal rate that characterizes the first phase of the battery charging cycle. This slope or rate-of-increase of voltage-with-time is a characteristic of the battery condition. So long as the normal slope of the first phase continues with the maximum level of charging current Im flowing, the battery voltage increases at about one millivolt per minute per cell. If current Im were to be held absolutely constant, the voltage sample across resistor R-36 would increase about eleven millivolts during the four-minute sampling cycle of this illustrative slope-detector circuit. However, under worst conditions of charging current regulation that might occur in practice, an extreme departure of the voltage to the high side might occur at the start of a four-minute battery-voltage sampling interval and an extreme departure at the low side might occur at the end of the four-minute sampling cycle. Under this extreme set of adverse deviations from average, the voltage sample stored in capacitor C-9 at the start of the four-minute interval is higher than it would be with a mean value of battery-charging current Im flowing, and at the end of the four-minute interval the voltage sample would be lower than it would be with the mean value of charging current Im flowing. Even under these extreme conditions, the voltage increase over the four-minute test interval of the slope detector is distinctly greater than the two millivolt setting of resistor R-37 mentioned above. Therefore, within the above-indicated latitude of battery-charging current and consequent voltage variation, the stored voltage sample applied by capacitor C-9 to the (+) input of amplifier OA-3 is normally lower while Im flows than the voltage sample across resistor R-36 reduced by the two millivolt drop in resistor R-37 and applied to the (−) input of this amplifier, so long as the battery is only partially charged.

It is possible for a battery to become fully charged without its voltage rising nearly to the voltage of a fully charged normal battery, as in the case of a six-cell battery having one bad cell. The protective circuit including transistor Q-2 may not block the charging of such a battery if its charge is not too far depleted. Such a battery may be costly and it may well be worthy of repair by replacing the bad cell. When such a battery is connected to the charger and allowed to charge, the charging current should be interrupted whenever the remaining cells are fully charged. This state might even be reached while the control circuit continues to deliver maximum charging current Im. When the battery becomes fully charged, the slope of the voltage-versus-time curve diminishes to the extent that triggering input to amplifier OA-3 is developed, terminating the supply of charging current.

Referring again to FIG. 6, it will be useful to examine a most adverse set of conditions that could occur over a slope-measurement-time interval while the "maximum" charging current Im flows. These could include a starting voltage V(1) with the upper limit Im(u.l.) of charging current flowing. Exactly the same voltage would occur at a later time at point p with the lower limit of charging current Im(l.l.) flowing, about 20 minutes later in the example of FIG. 6. With these limits of departure of the regulated nominally constant current, the voltage sampling interval of the slope detector is made sufficiently longer than 20 minutes to insure a definite voltage increase to point V(2) for example, sufficient to keep the slope detector in its first state that prevails throughout the battery-charging cycle.

If the upper and lower limits of charging current are replaced by a narrower latitude of charging current limits, evidently a much shorter test interval for the slope detector (from the starting-point voltage V'(1) to the end-point V'(2)) will serve to attain the same assured increase in voltage over the test interval as in the case of V(1) and V(2).

The range of variation of maximum charging current Im between Im(u.l.) and Im(l.l.) depends on the design of the feedback loop (see "Charging Current Sig.") involving resistor R-44, the filter primarily including resistors R-18 and R-19 and capacitor C-3, and on highgain operational amplifier OA-2, on the circuit of SCR-1 and SCR-2 and on the firing-pulse generating circuit. It has been found eminently practical to use a 4-minute slope-measurement time interval for dependably developing more than the threshold voltage of the slope detector without resort to close-tolerance components. The slope detector reverses its state if less than the "threshold" rise occurs, signifying a fully charged battery.

After the voltage Va is reached, (approximately 2.3 volts in the example considered above), the tapercharge part $I_t$ of the current curve (FIG. 5) commences. The current declines, but at a sufficiently slow rate to insure continued increase of the voltage. This tapercharge process continues to point Vb, after which the current continues at a constant level $I_f$. The slope detector is operative to signal the completion-of-charge state of the battery (by reversal of slate of amplifier OA-3) when the voltage rise during the slope-measurement interval is less than the "threshold" voltage rise for which the detector is set. This occurs at or after the break Vc in the voltage curve.

A latitude of deviation of the charging current could occur due to numerous factors, between limits If(u.l.) and If(l.l.). The regulation of the charging current is tightly controlled to keep this latitude small. Under most adverse conditions, the current $I_f$(l.l.) could be in effect (at or after break Vc in the curve) when a slope-measurement interval starts. At this moment the voltage Vc(l.l.) prevails. If this same current were to prevail at the end of the slope-measurement interval, the slope detector would signal completion-of-charge, just as if $I_f$ prevailed throughout the slope-measurement interval. However, at the end of this slope-measurement interval the current $I_f$(u.l.) could be in effect, again considering most adverse conditions. The voltage Vc(u.l.) would prevail. If the current regulation were poor, this would exceed the threshold of the slope detector and charging of the battery would continue. The limits of charging current $I_f$ in the final phase of the charging cycle should be held small enough so that charge-completion response of the slope detector occurs after point Vc is reached.

Figure 2:
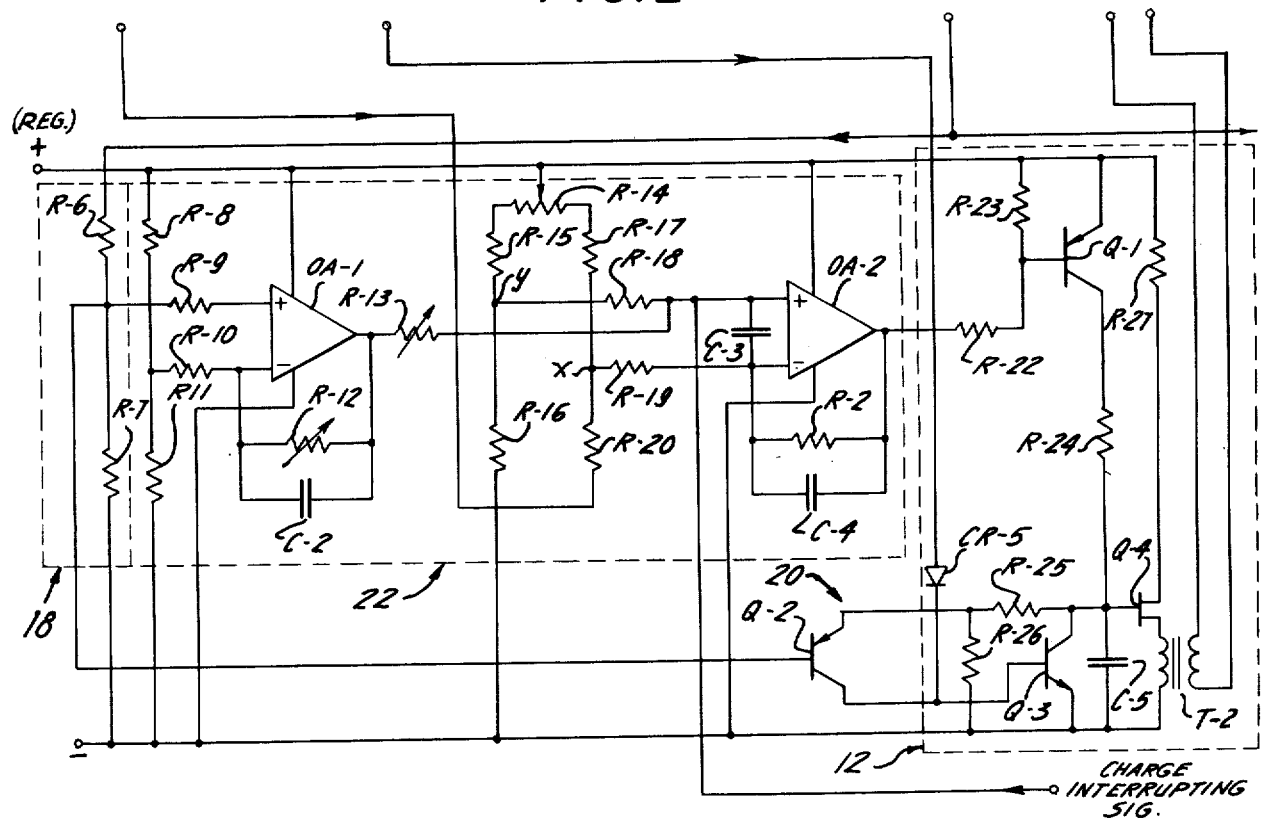
FIG. 2 is a wiring diagram of most of the control circuit for the charging current circuit in FIG. 1.

It is by no means vital for charging of the battery to terminate at the first slope-measurement interval after point Vc. If extreme adverse conditions of current variation should be such as to cause a voltage rise exceeding the threshold of the slope detector, then another 4-minute charging period would occur. It is important to keep the difference between currents $I_f$(u.l.) and $I_f$(l.l.) small to avoid the likelihood of the slope-detector failing to recognize the fully charged condition of the battery during a protracted period while over-charging occurs. The feedback feature of the circuit in FIGS. 1 and 2 is an important aid in limiting the latitude of variation of the final-phase constant current $I_f$. Current in shunt 44 develops a signal which is applied to resistor R-20 (FIG. 2) and the rest of the regulating circuit, all of which acts to maintain constant current in shunt R-44.

It will be recalled that amplifier OA-3 is switched (and becomes latched) in its second or charge-interrupting state when the voltage across voltage-sampling resistor R-36 less the small drop in resistor R-37 is less than the stored voltage of capacitor C-9. To maintain the slope detector in its first state, thus allowing the battery-charging cycle to continue, the voltage drop V(2) across resistor R-36 must exceed the voltage V(1) plus the voltage across resistor R-37. The voltage drop across resistor R-37 establishes the threshold of the voltage increment over a test interval at the inputs of the operational amplifier OA-3 of the slope detector. This threshold is reached in the described circuit, proportioned as described, both in the case of a normal battery becoming fully charged while current $I_f$ flows and in the case of a 6-cell battery having one shorted cell becoming fully charged while carrying maximum charging current Im.

It is evident that the threshold increment needed for preventing change-of-state of the slope detector must be exceeded during the tapered decrease of charging current $I_t$. This requirement is satisfied in the described circuit by adjusting the gain of amplifier OA-1. In this way any decrease of the tapered charging current can be made dependent on a sufficient rise in voltage occurring during each test interval in the region between Va and Vb (FIG. 6).

What is claimed is:

1. The method of charging a battery whose charging cycle is characterized by a rising voltage-versus-time charging curve including a decreased-slope bend when it is fully charged, which includes the steps of supplying relatively high charging current to the battery during an initial phase and reduced charging current to the battery later in the charging cycle, periodically testing the slope of the voltage-versus-time charging curve during both said phases while continuing to supply charging current, deriving a representation of the charging current, smoothing and utilizing that representation in regulating the charging current within limits ensuring a minimum battery-voltage increment during each slope-testing interval for a sound battery that is not fully charged, and terminating the charging cycle after a slope test that shows less than a predetermined battery-voltage increment.

2. The method of charging a battery according to claim 1, for a battery having an initial phase in its charging cycle ending at a battery-voltage level associated with the start of significant gassing, wherein the charging current is regulated utilizing said charging current representation by maintaining it constant during said first phase within limits ensuring said predetermined battery-voltage increment for a normal battery during each said periodic slope test of said first phase.

3. The method of charging a battery according to claim 1, for a battery having a taper phase in its charging cycle above a level of voltage at which significant gassing starts in a normal battery, wherein the charging current is regulated by progressively reducing it during said taper phase but limiting the rate of such reduction to ensure exceeding said predetermined battery-voltage increment during each said periodic slope test of said taper phase.

4. The method of charging a battery according to claim 1, for a battery having a final phase in its charging cycle during which the battery voltage rises until the charging curve reaches a maximum indicating that the battery is fully charged, wherein the charging current is regulated for maintaining it constant within limits preventing repetitions of greater than said predetermined battery-voltage increment during slope tests after the battery has been fully charged.

5. The method of charging a battery according to claim 1, for a battery having an initial phase in its charging cycle ending with the start of significant gassing and a final phase characterized by rising battery voltage until the slope of the voltage-versus-time curve reaches a maximum and having a transitional phase between said initial and final phases, wherein the current is regulated within the aforesaid limits while maintaining high constant current during the initial phase and reduced constant current during the final phase and reducing the current progressively from said high constant current to said reduced constant current during said transitional phase.

6. The method of charging a battery according to claim 1, wherein said periodic testing of the slope of the charging curve includes sampling the battery voltage at the start and at the end of a predetermined slope-testing time interval and comparing the battery-voltage sample at the end of each slope-testing interval with a representation of the battery-voltage sample at the start of the corresponding test interval.

7. The method of claim 1, wherein the current is regulated by maintaining it constant within limits as aforesaid during at least part of the charging cycle.

8. Apparatus for charging a battery having a rising voltage-versus-time battery-charging curve that includes a decreased-slope bend when the battery becomes fully charged, which includes means for supplying charging current to the battery, means operative during continued flow of charging current for periodically testing the slope of the voltage-versus-time curve of the battery being charged, means for providing a smoothed signal representation of the battery charging current, means responsive to the charging-current representation for regulating the charging current supplying means for providing an initial phase of high charging current and a later phase of reduced current, said regulating means being responsive to said signal providing means for restricting charging current variation within limits ensuring occurrence of a minimum battery-voltage increment during each slope-testing interval for a sound battery that is not fully charged during flow of both said high charging current and said reduced charging current, and means responsive to the slope testing means for signalling full charge of the battery in the region of the bend in said battery-charging curve when the slope of the curve is less than a predetermined minimum during a test interval.

9. Battery charging apparatus in accordance with claim 8, wherein said signalling means comprises means to terminate the charging cycle.

10. Battery charging apparatus in accordance with claim 9, wherein said regulating means is effective during at least part of the charging cycle to maintain the charging current constant within limits as aforesaid.

11. Battery charging apparatus in accordance with claim 9, wherein said regulating means is effective to reduce the charging current progressively for part of the battery-charging curve below said bend in the battery-charging curve of a normal battery while limiting the latitude of charging current variation to assure development of said predetermined battery voltage increment during each test interval.

12. Battery charging apparatus in accordance with claim 9, wherein said regulating means is effective in the region of bend in the battery-voltage to maintain constant charging current within limits preventing repeated occurrences of greater than said predetermined battery-voltage increment after the battery is fully charged.

13. Battery charging apparatus in accordance with claim 8, wherein said slope testing means includes means for sampling the battery voltage at the start and at the end of a slope testing interval and means for comparing the battery-voltage sample at the end of the interval with a representation of the sample at the start of the interval.

14. Battery charging apparatus in accordance with claim 13, wherein said battery voltage sampling means includes a capacitor and switch means for connecting the capacitor briefly at the start of a test interval to a battery-voltage representing point in the apparatus and for connecting the capacitor to the comparing means at the end of the test interval, at least one terminal of the capacitor being connected only to said switch means.

15. Battery charging apparatus in accordance with claim 8, the battery-charging curve including a first portion of gradually rising voltage and a second steeply rising portion between the first portion and the bend, wherein the regulating means includes means effective during said first portion of the curve to maintain a relatively high level of charging current that is held constant within limits assuring development of said minimum slope during each measurement interval and means for progressively reducing the charging current during at least part of said second portion of the curve while maintaining the current high enough to assure development of said minimum slope during each slope-measurement interval, and means operative in the region of said bend for maintaining the charging current constant within limits preventing repeated occurrence of voltage increments as great as said predetermined minimum during the slope tests occurring after the bend in said curve is reached.

16. A battery charger as in claim 9, wherein said battery-charging current supply means includes alternating current input means and rectifying means, and wherein said regulating means includes means for providing an averaged representation of the rectified battery-charging current.

17. A battery charger as in claim 9, wherein said control circuit includes charging-current supply terminals and means having voltage-sampling connection to said terminals for conditioning said regulating means to block operation of said battery-current supply means in response to excessively low voltage at said terminals.

18. Apparatus for charging a battery having a rising voltage-versus-time battery-charging curve that includes a decreased-slope bend as the battery becomes fully charged, including
(a) means for supplying charging current to the battery,
(b) means operative during continued flow of charging current for periodically testing the slope of the voltage-versus-time curve of the battery, said slope-testing means providing distinctive response to less than a predetermined minimum slope, representing attainment of the bend in the battery-charging curve and a fully charged battery, and
(c) regulating means for controlling said charging current supplying means, including
  (i) feedback means providing a smoothed signal representing the battery-charging current,
  (ii) reference signal providing means, and
  (iii) a circuit for controlling said charging current supply means including a high-gain operational amplifier having differential input coupling to said feedback means and said reference signal providing means,
said regulating means being adapted to restrict the latitude of charging current variation during any test interval to ensure attaining a minimum voltage increment in each test interval until said decreased-slope bend in the charging curve is reached.

19. Apparatus as in claim 18, including fixed-voltage reference first means, battery-voltage reference second means, and a further operational amplifier having differential input coupling to said first and second means, said further amplifier being coupled to said reference signal providing means and being adapted to progressively modify the reference signal input to said high-gain operational amplifier after the battery voltage reference exceeds the fixed voltage reference and thereby to reduce the battery charging current gradually after attainment of a predetermined battery voltage.

* * * * *